(12) United States Patent
Aruga (10) Patent No.: US 10,706,831 B2
(45) Date of Patent: Jul. 7, 2020

(54) FILM AND SOUND-ABSORBING STRUCTURE

(71) Applicant: AGC Inc., Chiyoda-ku (JP)

(72) Inventor: Hiroshi Aruga, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 246 days.

(21) Appl. No.: 15/782,917

(22) Filed: Oct. 13, 2017

(65) Prior Publication Data
US 2018/0047379 A1 Feb. 15, 2018

Related U.S. Application Data

(63) Continuation of application No. PCT/JP2016/066482, filed on Jun. 2, 2016.

(30) Foreign Application Priority Data

Jun. 9, 2015 (JP) ................................ 2015-116702

(51) Int. Cl.
*G10K 11/162* (2006.01)
*B29D 7/00* (2006.01)
(Continued)

(52) U.S. Cl.
CPC .............. *G10K 11/162* (2013.01); *B29D 7/00* (2013.01); *B32B 3/266* (2013.01); *B32B 27/08* (2013.01);
(Continued)

(58) Field of Classification Search
CPC ...... G10K 11/162; G10K 11/20; B32B 3/266; B32B 27/08; B32B 27/322; B32B 2307/102; E04D 5/12; E04B 1/8409
(Continued)

(56) References Cited

U.S. PATENT DOCUMENTS 3,460,299 A * 8/1969 Wilson .................... E04B 9/303
52/144
4,787,296 A * 11/1988 Huang .................. E06B 3/6707
181/289
(Continued)

FOREIGN PATENT DOCUMENTS

| CN | 1754201 A | 3/2006 |
|---|---|---|
| JP | 2002-521722 | 7/2002 |
| JP | 2011-520052 | 7/2011 |

OTHER PUBLICATIONS

International Search Report dated Aug. 16, 2016 in PCT/JP2016/066482, filed on Jun. 2, 2016.

*Primary Examiner* — Forrest M Phillips
(74) *Attorney, Agent, or Firm* — Oblon, McClelland, Maier & Neustadt, L.L.P.

(57) ABSTRACT

There is provided a film usable as a lightweight sound absorbing film having an excellent sound absorbing property, and a sound absorbing structure with such a film.
A film 1 including a plurality of fine through holes 2 formed therein, the film having an average thickness t (μm) in portions of the film having no through holes 2 formed therein, the through holes having an average depth T (μm) including a burr on a circumferential edge thereof, the through holes 2 having an average hole diameter d (μm), and the film 1 having an open area rate y (%) per unit area; the film satisfying all of the following formulas:

$90 \leq t \leq 300$, $1.02 < T/t \leq 1.5$, $0.7 < d/t < 1.4$, and $0.5 < y < 1.7$.

20 Claims, 4 Drawing Sheets

(51) Int. Cl.
  *B32B 3/26*    (2006.01)
  *B32B 27/08*   (2006.01)
  *B32B 27/32*   (2006.01)
  *E04D 5/12*    (2006.01)
  *E04B 1/84*    (2006.01)
  *G10K 11/20*   (2006.01)

(52) U.S. Cl.
  CPC .............. *B32B 27/322* (2013.01); *E04D 5/12* (2013.01); *B32B 2307/102* (2013.01); *E04B 1/8409* (2013.01); *G10K 11/20* (2013.01)

(58) Field of Classification Search
  USPC ......................................................... 181/289
  See application file for complete search history.

(56) References Cited

U.S. PATENT DOCUMENTS

| | | | | |
|---|---|---|---|---|
| 5,532,440 | A * | 7/1996 | Fujiwara .................. | E04B 1/86 181/289 |
| 7,829,192 | B2 * | 11/2010 | Boure ............... | B32B 17/10036 428/437 |
| 2001/0050197 | A1 * | 12/2001 | Wood ..................... | G10K 11/16 181/292 |
| 2011/0048850 | A1 * | 3/2011 | Alexander ............ | E04B 1/8409 181/296 |
| 2014/0299408 | A1 * | 10/2014 | Swinkels ............. | G10K 11/172 181/289 |

* cited by examiner

Sound source side

FILM AND SOUND-ABSORBING STRUCTURE

TECHNICAL FIELD

The present invention relates to a film and a sound absorbing structure suitably used as a building material for sound absorption.

BACKGROUND ART

For recent years, a roofing material made of a resin film having an excellent daylighting property, light weight etc. has been more frequently laid on the roof of an athletic facility for soccer football, rugby football, American football, swimming or other sports, or on the roof of a place where a move is shown or a concert is held. As part of noise countermeasures around such facilities, the roofing material is required to be provided with a sound insulating property and a sound absorbing property. From this point of view, an investigation has been made to lay a film on an inner side of a roofing material through an air layer to serve as a sound absorbing film to prevent a sound from leaking outside the facility. When such measures are taken to prevent a sound from leaking outside the facility, the film is required to have a sound absorbing property of absorbing a sound because it is important to simultaneously prevent reverberation from being generated due to sound booming in a facility.

For example, Patent Document 1 discloses a technique that a film with fine through holes formed therein serves as a sound absorbing film, and recites that the through holes are formed as tapered through holes in the film such that the through holes have different opening diameters on a front side and a rear side of the film to improve a sound absorbing property.

PRIOR ART DOCUMENTS

Patent Documents

Patent Document 1: JP-A-2002-521722

DISCLOSURE OF INVENTION

Technical Problem

With regard to the application of the sound absorbing film as the roofing material, not only a sound absorbing property but also light weight is an important factor. Although an attempt may be made to reduce the thickness of the sound absorbing film to make the sound absorbing film lighter because the mass of the sound absorbing film is proportional to the thickness, a reduction of the film thickness is likely to cause a problem of degrading the sound absorbing property. A reduction in the film thickness of the sound absorbing film disclosed in Patent Document 1 is also involved in the problem of degrading the sound absorbing property.

The present invention is proposed in view of the above-mentioned circumstances. It is an object of the present invention to provide a film usable as a lightweight sound absorbing film having an excellent sound absorbing property, and a sound absorbing structure with such a film.

Solution to Problem

The present invention provides a film and a sound absorbing structure recited in the following items (1) to (12):

(1) A film including a plurality of fine through holes formed therein, the film having an average thickness $t$ (μm) in portions of the film having no through holes formed therein, the through holes having an average depth $T$ (μm) including a burr on a circumferential edge thereof, the through holes having an average hole diameter $d$ (μm), and the film having an open area rate $y$ (%) per unit area; the film satisfying all of the following formulas:

$$90 \leq t \leq 300,$$

$$1.02 < T/t \leq 1.5,$$

$$0.7 < d/t < 1.4, \text{ and}$$

$$0.5 < y < 1.7.$$

(2) The film recited in item (1), wherein the film is made of a fluororesin.

(3) The film recited in item (1) or (2), wherein the film is made of an ethylene-tetrafluoroethylene copolymer.

(4) The film recited in any one of items (1) to (3), wherein the film has an average sound absorption coefficient of at least 0.5 for sounds having a frequency of from 200 Hz to 4,000 Hz as measured based on JIS A1405-2:2007.

(5) The film recited in any one of items (1) to (4), wherein the film has a visible light transmittance of at least 60% by measurement of visible light transmittance based on JIS R-3106:1998.

(6) The film recited in any one of items (1) to (5), wherein the film is directed to sound absorption.

(7) A sound absorbing structure including the film recited in any one of items (1) to (6), and a sound wave reflecting member, such that the film, a rear air layer and the sound wave reflecting member are disposed in this order toward a sound source.

(8) The sound absorbing structure recited in item (7), wherein the rear air layer has a thickness of from 10 mm to 1,000 mm.

(9) A laminated film with a sound absorbing property, including at least two films recited in any one of items (1) to (5) disposed so as to be apart from each other.

(10) The laminated film recited in item (9), wherein adjacent films are apart from each other by a distance of from 5 mm to 500 mm.

(11) A sound absorbing structure including the laminated film recited in item (9), and a sound wave reflecting member, such that the laminated film, a rear air layer and the sound wave reflecting member are disposed in this order toward a sound source.

(12) The sound absorbing structure recited in item (11), wherein the rear air layer has a thickness of from 10 mm to 1,000 mm.

Advantageous Effects of Invention

The present invention provides a film usable as a lightweight sound absorbing film having an excellent sound absorbing property, and a sound absorbing structure with such a film.

DESCRIPTION OF EMBODIMENTS

The following terms in Description mean as follows:

The term "burr" means a convex portion formed on a circumferential edge of an opening of a through hole, including a projection or buildup. The terms "film-like base material" means a film as a material, which has not yet a plurality of fine through holes formed therein.

[Film]

The film according to the present invention is a film which has a plurality of fine through holes formed therein, wherein the film has an average thickness t (μm) in portions of the film having no through holes formed therein, the through holes have an average depth T (μm) including a burr on a circumferential edge of a through hole, the through holes have an average hole diameter d (μm), and the film has a hole area rate y (%) per unit area. The film satisfies all of the following formulas of $90 \leq t \leq 300$, $1.02 < T/t \leq 1.5$, $0.7 < d/t < 1.4$, and $0.5 < y < 1.7$.

Figure 1:
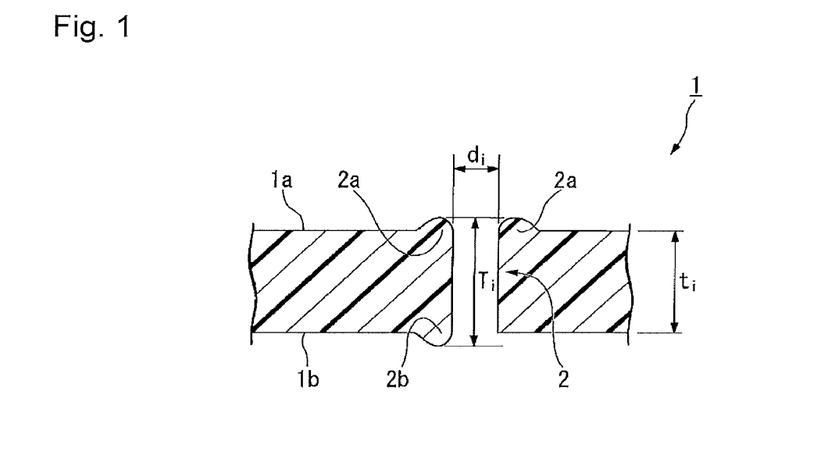
FIG. 1 is a cross-sectional view of the film according to an embodiment of the present invention in a thickness direction of the film.

FIG. 1 is an enlarged cross-sectional view of a portion of the film 1 according to an embodiment of the present invention, which has a plurality of fine through holes 2 formed therein. In this figure, the hole diameter of a through hole 2, the depth of the through hole 2 and portions of the film with no through holes 2 formed therein are represented by di, Ti and ti, respectively. The burrs formed on circumferential edges of the openings of the through hole 2 are denoted by reference symbols of 2a and 2b, respectively.

The cross-sectional view of FIG. 1 is depicted so as to contain the central axis of a through hole 2, which extends along the thickness direction of the film 1. The film 1 has burrs formed on circumferential edges of the openings of the through hole 2 on a first side 1a and a second side 1b. The depth of the through hole 2 (denoted by an arrow T) is defined by the component of a vector extending in the thickness direction of the film, which starts with the top of the highest part of a burr 2a on the circumferential edge of the opening in the first side 1a and ends with the top of the highest part of a burr 2b on the circumferential edge of the opening in the second side 1b. The two burrs 2a apparently shown in FIG. 1 form actually a single bur around the circumferential edge of the opening in the first side 1a.

Although only the one through hole is shown in FIG. 1, the film 1 has many through holes 2 formed therein in a uniform distribution in the entire film so as to have substantially the same hole diameter and the same depth as one another (not shown). The through holes 2 have a greater average depth T than an average depth t in portions of the film with no through holes 2 formed therein.

Figure 2:
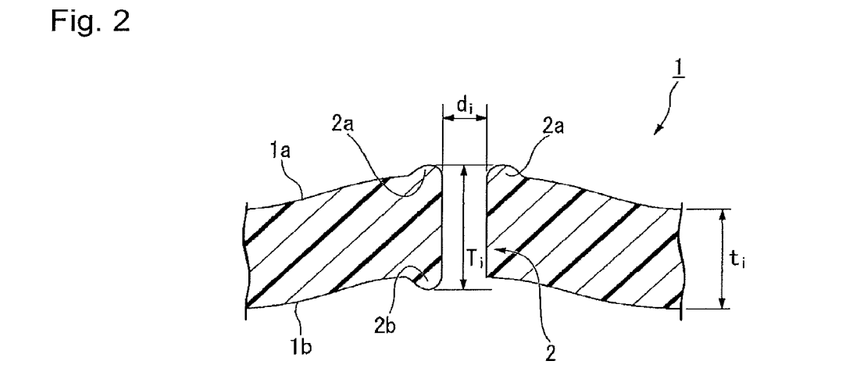
FIG. 2 is a cross-sectional view of the film according to an embodiment of the present invention in a thickness direction of the film.

In the film 1, the through holes 2 and their surroundings may be positioned in a deviation toward one of both sides of the film. For example, as shown in FIG. 2, the through holes 2 and their surroundings may be raised toward the first sides 1a of the film.

(Material for Forming Film)

The film 1 is preferred to be made of a resin. There is no particular limitation to the kind of the resin. The resin is preferred to be a fluororesin which is excellent in weather resistance, chemical resistance, stain resistance etc.

Examples of the fluororesin include a vinyl fluoride-based polymer, a vinylidene fluoride-based polymer, a vinylidene fluoride-hexafluoropropylene copolymer, a tetrafluoroethylene-hexafluoropropylene-vinylidene fluoride-based copolymer, a tetra fluoroethylene-propylene-based copolymer, a tetrafluoroethylene-vinylidene-fluoride-propylene-based copolymer, an ethylene-tetrafluoroethylene-based copolymer (hereinafter, also referred to as "ETFE"), a hexafluoropropylene-tetrafluoroethylene-based copolymer, an ethylene-hexafluoropropylene-tetrafluoroethylene-based copolymer, a perfluoro (alkyl vinyl ether)-tetrafluoroethylene-based copolymer, a chlorotrifluoroethylene-based polymer, and an ethylene-chlorotrifluoroethylene-based copolymer. Among them, ETFE is particularly preferred because of having a melting point of at least 200° C. enough to make deformation in the shape of the through holes difficult under a high temperature, being difficult to have the through holes enlarged even when a tension is applied to the perforated film and having a great resistance against a wind load or a snow load, or other reasons.

The resin forming the film 1 may be made of one kind of resin or at least two kinds of resins. When at least two kinds of resins are used, it is appropriate to blend a non-fluororesin blended into one of the above-mentioned resins so long as the weather resistance or the optical property of the film is impaired. The non-fluororesin may be, for example, an acrylic resin.

The film 1 may contain a pigment, such as a blue, white or silver pigment, an ultraviolet light absorbent, a light stabilizer, an antioxidant, an infrared absorbent, a flame retardant, a filler or another known additive so long as so long as the weather resistance or the optical property of the film is impaired. Further, the film 1 may have a coating layer containing such an additive, an antisticking material or a hard coating agent disposed on one or each of the sides.

(Thickness of Film)

The portions of the film with no through holes 2 formed therein have an average thickness t (μm) of $90 \leq t \leq 300$, preferably $120 \leq t \leq 250$, particularly preferably $150 \leq t \leq 250$ because of being excellent in light weight, sound absorbing property, strength, light transmittance or another factor.

When the average thickness t of the film 1 is set at at least the lower limit of the above-mentioned ranges, the film 1 can keep a sufficient sound absorbing property and a sufficient strength and sufficiently withstand the application of the absorbing film. When the average thickness t of the film 1 is set at at most the upper limit of the above-mentioned ranges, the film 1 is excellent in light weight and light transmittance.

In Description, the average thickness t is a value obtained by arithmetically averaging the values of the thickness ti of the film 1 measured at three points selected in margin portions apart from all of the through holes 2 by at least 0.4 mm. In most cases, the measured values of the thickness ti at the three points are substantially equal to one another, and the average value is substantially the same as the thickness of the film-like base material.

(Shape of Through Holes)

There is no particular limitation to the shape of the through holes 2. The openings of the through holes may be, for example, formed in a circular shape, or a shape approximating to a circular shape, such as an oval shape, a square shape, a rectangular shape or a hexagonal shape, as seen in a depth direction thereof from the first side 1a or the second side 1b of the film 1. The openings of the through holes 2 may be formed in a well-regulated shape or in an irregular shape, such as a shape partly protruding or depressed in a radial direction of the through holes. The through holes 2 may be formed in either one of a rectangular shape or a trapezoidal shape as seen in the cross-section of the film 1, or may be formed in an irregular shape, such as a shape partly protruding or depressed with respect to the depth direction of the through holes.

The through holes 2 formed in the film 1 may be formed in a uniform shape or in non-uniform shapes.
(Hole Diameter of Through Holes)

Each of the through holes 2 has a hole diameter di defined as a converted value that is equal to the diameter of a circle having the same area as the area of a region where an opposite side of the film with the through holes formed therein is visible as seen, in the thickness direction, from the first side 1a or the second side 1b of the film.

The average hole diameter d (μm) of the through holes 2 formed in the film 1 is found by arithmetically averaging the values of the hole diameters of di of the respective through holes 2. The number of the through holes subjected to measurement of the hole diameters of di is supposed to 50.

The average hole diameter d satisfies $0.7 < d/t < 1.4$ and is preferably $0.8 \leq d/t \leq 1.3$ in terms of having an improved absorbing property with respect to the average thickness t of the film.

When $0.7 < d/t$ is satisfied, it is possible not only to have an improved sound absorbing property but also to further reduce the weight of the film 1. When $d/t < 1.4$ is satisfied, it is possible not only to have an improved sound absorbing property but also to make the film 1 kept a sufficient strength.

It should be noted that two films, which have the same hold diameter d but have different shapes of through holes, have substantially the same sound absorbing property as each other.
(Depth of Through Holes)

Most of the through holes 2 formed in the film 1 have burrs formed at circumferential edges of the openings. The film 1 can be severed at substantially the centers of through holes 2 with a sharp razor made of a stainless steel to cut out a section of the film along the depth direction of the through holes 2 such that the through holes are little deformed.

The depth Ti of each through hole 2 may be found by using a CCD microscope to observe the respective sections of the entire circumferential edges of the openings of the through hole 2 in a direction parallel to a film surface and measuring the length of a vector perpendicular to the film surface, the vector starting with the top of the highest part of the burr 2a protruding from the first side 1a and ending with the top of the highest part of the burr 2b protruding from the second side 1b.

When the burrs are formed on only one of the sides of the film, the depth may be found based on a length between the top of a formed burr and the side of the film having no burrs formed thereon.

The average depth T (μm) of the through holes 2 formed in the film 1 is found by arithmetically averaging the values of the depth Ti of the respective through holes 2. The number of the through holes subjected to measurement of the average depth T is supposed to 50.

The average depth T satisfies $1.02 < T/t \leq 1.5$ and is preferably $1.1 \leq T/t \leq 1.4$ in terms of having an improved absorbing property with respect to the average thickness t of the film.

When $1.02 < T/t$ is satisfied, it is possible to sufficiently have an improved sound absorbing property. When $T/t \leq 1.5$ is satisfied, it is possible not only to sufficiently have an improved sound absorbing property but also to reduce a decrease in the light transmission caused by the burrs.

When the rate of T/t increases to be beyond 1.5, it is not possible to have an improved sound absorbing property. Further, when the film having such a rate is placed outside, dirt is apt to be accumulated around the burrs such that it is easy to decrease the visible light transmittance of the film.
(Open Area Rate)

The film 1 has an open area rate of y of $0.5 < y < 1.7$, preferably $0.7 \leq y \leq 1.5$ in terms of being excellent in sound absorbing property, strength, light transmittance or another factor.

When $0.5 < y$ is satisfied, it is possible to sufficiently have an improved sound absorbing property. When $y < 1.7$ is satisfied, it is possible not only to sufficiently have an improved sound absorbing property but also to have the film kept a sufficient strength.

The open area rate y of the film 1 is calculated based on the following formula (1):

$$\text{Open area rate(unit: \%)} = [(\text{the average hole diameter } d \text{ of through holes} \div 2)^2 \times \pi \text{ (as circle rate)} \times (\text{the number of the through holes in a unit area})] \div (\text{the unit area of the film}) \times 100 \quad (1)$$

In this formula, the unit area of the film is 100 cm².

The number of the through holes in the unit area is not limited to an integral number, and may be a number containing a decimal.
(Sound Absorption Coefficient)

The film 1 has an average sound absorption coefficient of preferably at least 0.5 for sounds having a frequency of from 200 Hz to 4,000 Hz as measured based on JIS A1405-2: 2007.
(Light Transmittance)

The film 1 has a visible light transmittance of preferably at least 60%, more preferably at least 70%, further preferably at least 80%, furthermore preferably at least 85% by measurement of visible light transmittance based on JIS R-3106:1998 "Testing method on transmittance, reflectance and emittance of flat glasses and evaluation of solar heat gain coefficient". A film having such a high visible light transmittance is useful as a daylighting roofing material.

The visible light transmittance of the film 1 may be property controlled, depending on the kind of a resin forming the film 1, the average thickness t, the average depth T of the through holes 2, the average hole diameter d of the through holes, the open area rate y, or another factor.
(Haze)

The film 1 preferably has a lower haze when the film is used as a daylighting roofing material. When a roofing material has a low haze, it is possible to have a feeling of release because an outside state is presumed. The haze is, for example, preferably less than 70%, more preferably less than 50%, particularly preferably less than 30%.
[Process for Producing Film]

There is no particular limitation to the process for producing the film according to the present invention. A desired film may be obtained by using a known method to prepare a film-like base material and form through holes in desired number, shape and open area rate in the film-like base material, for example.

(Method for Forming Through Holes)

There is no particular limitation to the method for forming the through holes. Examples of the method for forming the through holes include a punching method, a drilling method, a pinhole method and a laser irradiation method.

The punching method (pressing method) is a method for sandwiching a film-like base material between a top mold and a bottom mold to remove portions of the film-like base material by punching (carrying out punching processing). The drilling method is a method for drilling holes in a film-like base material to form through holes while the pinhole method is a method for sticking pins into a film-like base material to form through holes. The laser irradiation method is a method for forming through holes by locally irradiating a film-like base material with, e.g. a $CO_2$ laser to melt the film-like base material by heat.

The punching method and the pinhole method can simultaneously form hundreds of through holes. The punching method has a working speed of from 3 m/min to 50 m/min while the pinhole processing has a maximum working speed of about 5 m/min. With regard to working accuracy, the punching method can form the through holes in a more uniform shape than the pinhole method because the punching method cuts portions of the film-like base material to serve as the through holes and takes out such portions from the film-like base material while the pinhole method merely form the through holes in the film-like base material. Although the laser method can form the through holes in a much more uniform shape, this method has a slow working speed because of forming only several through holes by one shot.

In general, when the pinhole method is used to form through holes in a thick film having a thickness of at least 100 μm, a large force needs to be applied to pins when sticking the pins into the film. For this reason, the film is deformed during formation of the through holes in the film. In order to perpendicularly push the pins into the film, it is necessary to use a jig to support the film.

The punching method or the laser irradiation method is preferred because of being excellent in working speed and working accuracy.

There is no particular limitation to how to control the shape of through holes to be formed. For example, it is preferred to form the through holes in a circular shape in the punching method because it is easy to machine required molds. In the drilling method, the shape of through holes is determined by the shape of drills. It is preferred to form the through holes in a circular shape in the drilling method because the circular through holes have the minimum peripheral length to removed areas during pulling out the needles or drills after sticking such that the occurrence of hooking is minimized to make pulling-out operation smooth and make the working speed faster. In the pinhole method, it is preferred to form the pins in a shape so as to be capable of passing through a film to form the through holes in a desired shape. Although the shape of the through holes is determined by the shape of the focal point of a laser beam in the laser irradiation system, it is most easy to focus on a desired target to facilitate machining when the through holes are formed in a circular shape.

There is no particular limitation to how to control the hole diameter of through holes to be formed. For example, the punching method may adopt a method for controlling the size of molds, and the drilling method may adopt a method for controlling the thickness of drills to be used. The pinhole method may adopt a method for controlling the thickness of pins to be used, and the laser method may adopt a method for controlling the diameter of a laser beam. In the pinhole method, when pins, which have a thickness gradually increasing from a tip toward a root, are stuck into a film-like base material, it is possible to adjust the sticking depth of the pins to control the hole diameters of the through holes to be formed.

(Method for Forming Burrs)

There is no limitation to the method for forming burrs on circumferential edges of the openings of the through holes when the through holes are formed. When punching processing is made by the punching method, the clearance between the top mold and the bottom mold may be controlled to form the burrs. When the drilling method or the punching method is carried out, the sticking speed, the sticking angle, the pulling-off speed, the pulling-out angle of the drills or the pins to be inserted into a film may be controlled. When the laser irradiation method is carried out, the irradiation intensity or the irradiation angle of the laser beam may be controlled. The burrs are usually likely to be formed on a side (second side) opposite to a side (first side) of a film-like material where the molds etc. are stuck. In some times, the burrs are also formed on the first side when the molds stuck into the film are drawn out.

Examples of the control method for raising the top of the burrs when forming the burrs include a method for increasing the clearance, a method for increasing the speed for sticking drills or pins in a film or pulling out the drills or the pins from the film, and a method for decreasing the irradiation intensity of the laser beam. Conversely, in order to lower the top of the burrs, operation opposite to the above methods may be performed.

(Annealing Treatment)

Annealing treatment may be performed to heat and cool the film after forming a plurality of through holes in a film-like base material and burrs on the film-like base material. There is no limitation to the heating temperature. Considering the possibility that the film could be heated to, for example, about 60° C. when being used outdoor, it is preferred to heat the film to at least 70° C. that is higher than the reaching temperature. The formed through holes or burrs trend to be slightly shrunk by heating, although depending on the kind of a used film-like base material. The annealing treatment is finished by cooling the treated film to room temperature after lapse of a certain heating period. The annealing treatment can be performed to prevent the through holes or the burrs from being shrunk even when a temperature change occurs during using of the film.

When it is predicted that the annealing treatment could shrink through holes or burrs, the through holes or burrs may be preliminarily formed so as to be greater by a predicted shrinking amount.

[Sound Absorbing Structure]

The sound absorbing structure according to the present invention includes the film according to the present invention and a sound wave reflecting member, such that the film, a rear air layer and the sound wave reflecting member are disposed in this order toward a sound source.

(Film)

There is no particular limitation to the number of the film according to the present invention, which is disposed closer to the sound source than the sound wave reflecting member. The number may be one or at least two. When at least two films are disposed, the respective films may be the same as each other or different from each other. A laminate, which has at least two films according to the present invention disposed so as to be apart from each other, is hereinbelow called "the laminated film".

In the laminated film, there is no particular limitation to the distance between adjacent films. For example, adjacent films are apart from each other by a distance of preferably from 5 mm to 500 mm, more preferably from 5 mm to 100 mm, particularly preferably from 20 mm to 50 mm.

When the distance between adjacent films is at least the lower limit of the above-mentioned ranges, the application of a sound wave impulse can prevent the adjacent films from being brought into contact with each other to cause malfunctioning. When the distance between adjacent films is at most the upper limit of the above-mentioned ranges, it is possible to sufficiently have an improved sound absorbing property.

(Sound Reflecting Member)

There is no limitation to the material for the sound reflecting member so long as the material is a material capable of reflecting at least a part of a sound wave coming from the sound source. For example, an inorganic material, such as glass, metal, ceramic or concrete, or an organic material, such as a resin or wood, is applicable to the material.

There is no limitation to the shape of the sound reflecting member so long as the material is a material capable of reflecting at least a part of a sound wave coming from the sound source. For example, a shape having a reflecting surface, such as a cushion-like one (e.g. an outer covering structure having air filled in between two ETFE films as disclosed by JP-A-2009-177163), a block-like one, a plate-like one or a film-like one is applicable. The reflecting surface may be flat or curved. The reflecting surface may be smooth or irregular.

(Rear Air Layer)

There is no limitation to the thickness of the air layer between the sound reflecting member and the film (which is one closest to the sound reflecting member in the case of the laminated film). The rear air layer has a thickness of preferably from 10 mm to 1,000 mm, more preferably from 50 mm to 600 mm, particularly preferably from 100 mm to 300 mm. When the thickness of the air layer is at least the lower limit of the above-mentioned ranges, it is possible to sufficiently have an improved sound absorbing property. When the thickness of the air layer is at most the upper limit of the above-mentioned ranges, it is possible to prevent reverberation from being generated in the air layer.

Figure 3:
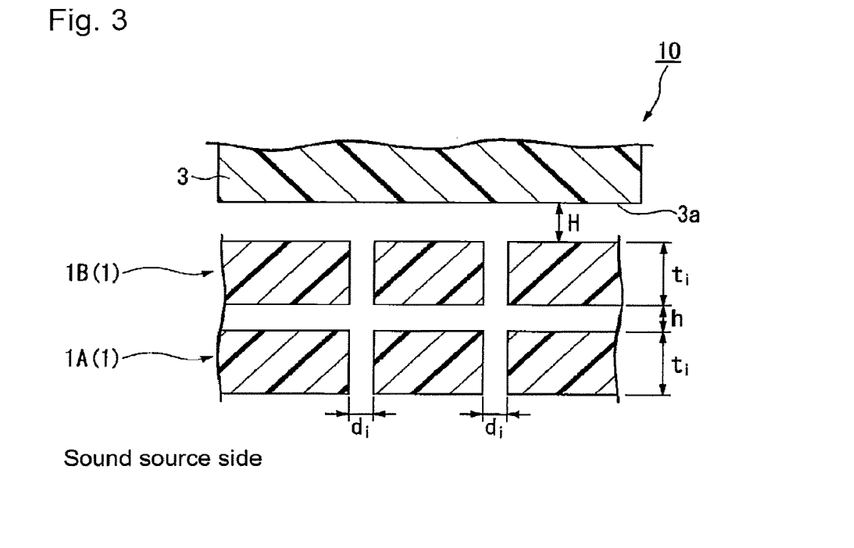
FIG. 3 is a cross-sectional view of the sound absorbing structure according to an embodiment of the present invention and including the film according to an embodiment of the present invention in a thickness direction of the film.

FIG. 3 is an enlarged cross-sectional view showing a portion of the sound absorbing structure 10 according to an embodiment of the present invention. In this figure, a portion of the sound absorbing structure, which includes a first film 1A(1), an air layer (first air layer) and a second film 1B(1), corresponds to the laminated film according to the present invention. The sound absorbing structure 10 has the laminated film, the rear air layer (second air layer), and the sound reflecting member 3 made in a cushion-like shape and of a transparent resin sheet with air filled therein disposed in this order toward a sound source.

It should be noted that in FIG. 3, the same reference numerals as those in FIG. 1 denote the same members as those shown in FIG. 1. Because FIG. 3 is an enlarge view to show through holes, the cushion-like sound reflecting member 3 is shown so as to have only the front side (sound reflecting side).

In the laminated film according to the present invention, each of the films 1A and 1B having a thickness ti is disposed so as to have each film surface substantially parallel to a sound reflecting surface 3a of the sound reflecting member 3. Between the sound reflecting surface 3a and the laminated film, the rear air layer is disposed to have a thickness H.

Although the respective films 1A and 1B of the laminated film have through holes formed in a hole diameter di such that the through holes have burrs formed at the openings, the burrs are omitted and unshown in FIG. 3 for simplification. The burrs of the respective through holes may protrude toward a sound source or the sound reflecting member.

In the sound absorbing structure 10, the air layers are disposed not only between the sound reflecting member 3 and the laminated film but also between the two films 1A and 1B of the laminate film.

The air layer in the laminated film has a thickness h (the distance between adjacent films) of preferably from 5 mm to 500 mm, more preferably from 5 mm to 100 mm, particularly preferably from 20 mm to 50 mm, as already described.

The rear air layer, which is disposed between the sound wave reflecting member 3 and a film of the laminated film close to the sound wave reflecting member (the second film 1B in the amendment shown in FIG. 3) has a thickness H of preferably from 10 mm to 1,000 mm, more preferably from 50 mm to 600 mm, particularly preferably from 100 mm to 300 mm.

When the thickness of each air layer is at least the lower limit of the above-mentioned ranges, it is possible to sufficiently have an improved sound absorbing property. When the thickness of each air layer is at most the upper limit of the above-mentioned ranges, it is possible to prevent reverberation from being generated in each air layer.

[Function and Effects]

The film according to the present invention has the through holes formed therein so as to have the burrs formed at the circumferential edges of the openings such that the through holes have a greater average thickness T than an average thickness t of the portions of the film with no through holes formed therein. Thus, it is possible not only to reduce the average thickness t of the film to decrease the weight of the entire film but also to keep the average depth T of the through holes significantly affecting the sound absorbing property such that the sound absorbing property is made excellent.

Although the average depth T of the through holes of the film according to the present invention is made from 1.02 to 1.50 times thicker than the average thickness t of the film to slightly shift a maximum sound absorption wavelength range toward a low frequency side, it is possible to have an increased sound absorption coefficient in the film as a whole.

The film according to the present invention is useful as a sound absorbing film because of having an excellent sound absorbing property as described above.

The film according to the present invention has an excellent sound absorbing property when the average thickness t of the film, the average depth T of the through holes, the average hole diameter d of the through holes, and the open area rate y are in the above-mentioned preferred ranges.

EXAMPLES

Although the present invention will be now described in more detail in reference to examples, the present invention is not limited to these examples. It should be noted that among Ex. 1 to 15, Ex. 1, 2, 4, 5, 7 and 10 to 14 are working examples while Ex. 3, 6, 8, 9 and 15 are comparative examples.

[Evaluation Method]

(Sound Absorption Coefficient)

A normal incident sound absorption coefficient measurement system called WinZacMTX produced by Nittobo Acoustic Engineering Co., Ltd. was used to measure average sound absorption coefficients of ⅓ octaves in a frequency range from 200 Hz to 4,000 Hz in accordance with the measuring method according to JIS A1405-2:2007 "Acoustics—Determination of sound absorption coefficient and impedance in impedance tubes—Part 2: Transfer-function method".

Films to be measured were set in the acoustic tube of the system by the following method.

A sample cutter having a cutting edge diameter of 47.5 mm was used to cut out one or two samples from the films in a circular shape, and the samples were sandwiched between sample holding rings (having an outer diameter of 48 mm and an inner diameter of 40 mm) to be held in a sample support holder. When two samples were sandwiched (as in Ex. 13 to 15), the air layer between the samples (the distance between the samples) was set at 30 mm. The sample support holder was set in the acoustic tube (having an inner diameter of 40 mm) to dispose one of the samples at a position close to a sound source, and a piston was controlled such that the air layer between the other sample and a sound reflecting member had a thickness of 100 mm.

(Light transmittance)

The light transmittance of the films were measured in accordance with JIS R3106:1998 by use of a spectrophotometer (UV-3100PC manufactured by Shimadzu Corporation). (haze)

The haze of the films were measured by use of a haze meter (manufactured by Suga Test Instruments Co., Ltd. and named MS 5).

(Hole Diameter)

Fifty through holes were selected at random among a plurality of through holes formed in an observation range of each film (about 30 cm long and about 10 cm wide). A CCD microscope (manufactured by Moritex Co., Ltd. and named SCOPEMAN MS-900HD) was used to measure the area of the opening region of each through hole where an opposite side of each film was visible. The hole diameter of each through hole was found by converting the area of the opening region into a value indicating the diameter of a circle having the same area as the area of the opening region, and the average hole diameter of the through holes was found by arithmetically averaging the values of the hole diameters of the respective through holes.

Both sides of each film were observed to measure an average hole diameter on the respective sides, and an intermediate value of the average hole diameters of both sides was determined as the average hole diameter d of a film as a final product.

(Open Area Rate)

The number of the through holes formed in a unit area of 100 cm² of the films was counted, and the open area rate y of the films was found, based on the measured values of the average hole diameter d of the through holes previously found, in accordance with the above-mentioned formula (1).

(Depth of Through Holes)

A razor having a thickness of 0.076 mm and made of a stainless steel (manufactured by FEATHER Safety Razor Co., Ltd.) was used to sever the films 1 at substantially the centers of the through holes so as to cut out sections of the films along the depth direction of the through holes. Both cut faces divided into two parts were observed by the CCD microscope. The sections of the entire circumferential edges of the openings were observed by making observations on both cut faces.

The depth of each through hole was found by using the CCD microscope to observe the respective sections of the entire circumferential edges of the opening of the through hole in a direction parallel to a film surface and measuring the length of a vector perpendicular to the film surface, the vector starting with the top of the highest part of the burr protruding from a first side and ending with the top of the highest part of the burr protruding from a second side.

The lengths of the respective vector components were measured at the two cut out sections, and the value indicative of a longer length was determined as being the value indicating the depth.

When the burrs were formed on only one of the sides of the film, the depth was found based on a length between the top of each formed burr and the side of the film having no burr formed thereon.

Fifty through holes were selected at random among a plurality of through holes formed in the observation range of each film, and the average depth T of the through holes was found by arithmetically averaging the values of the depth Ti of the respective through holes.

(Thickness of Portions of Film with No Through Holes Formed Therein)

Three points on each film, which were selected in margin portions apart from all of the through holes by at least 0.4 mm as portions of the film with no through holes formed therein, were measured by the CCD microscope. The average thickness t was determined as being a value obtained by arithmetically averaging the values of the thicknesses of the respective points on the film.

It should be noted that the average thickness t in the portions of each film with no through holes formed therein in the following examples was the same as the thickness of the film-like base material before formation of the through holes, which was measured by a non-contact type thickness gauge (manufactured by Yamabun Electronics Co., Ltd. and named TOR-5R).

[Members Used in Examples]

(Film-Like Base Material)

ETFE200: It is an ETFE resin film having a thickness of 200 μm (Product name: ETFE film 200NJ available under the registered trademark Fluon, manufactured by Asahi Glass Company, Limited, and having a melting point of 260° C. and a glass transition point of 90° C.).

ETFE150: It is an ETFE resin film having a thickness of 150 μm (Product name: ETFE film 150NJ available under the registered trademark Fluon, manufactured by Asahi Glass Company, Limited, and having a melting point of 260° C. and a glass transition point of 90° C.).

Ex. 1

A plurality of through holes were formed in a film-like base material of EFTE 200 in a uniform distribution by the following method:

A drum-type piercing machine with silk needles having a diameter of 0.53 mm for ultra-thin fabrics was used to stick the base material with the silk needles at pitches of 2 mm in longitudinal and lateral directions and in a depth of 2 mm so as to form the through holes with the needle temperature being set at 60° C., and with the base material being supplied at a speed of 10 m/min. In the respective through holes, no burr was formed on a side of the base material with the needles struck while burrs were formed only on the other side of the base material with the tips of the silk needles protruding therefrom.

The resultant film was moved along heat rolls having 90° C. to be dealt with heat treatment for about 4 seconds, followed by being naturally cooled at room temperature, and conducting respective measurements one day later.

For measurement of the sound absorption coefficient, the film was set in the acoustic tube so as to have a side with the burrs facing toward the sound source.

Ex. 2

A film was produced in the same way as in Ex. 1 except that silk needles having a diameter of 0.45 mm for ultra-thin fabrics were used to stick the base material with the silk needles in a depth of 1 mm so as to form through holes.

Ex. 3

A film was produced in the same way as in Ex. 1 except that silk needles having a diameter of 0.20 mm for ultra-thin fabrics were used to stick the base material with the silk needles in a depth of 1 mm so as to form through holes.

Ex. 4

The film produced in Ex. 1 was used. When the sound absorbing coefficient was measured, the film was set in the acoustic tube, having a side with the burrs facing toward the reflecting member opposite to the sound source.

Ex. 5

The film produced in Ex. 2 was used. When the sound absorbing coefficient was measured, the film was set in the acoustic tube, having a side with the burrs facing toward the reflecting member opposite to the sound source.

Ex. 6

The film produced in Ex. 3 was used. When the sound absorbing coefficient was measured, the film was set in the acoustic tube, having a side with the burrs facing toward the reflecting member opposite to the sound source.

Figure 4:
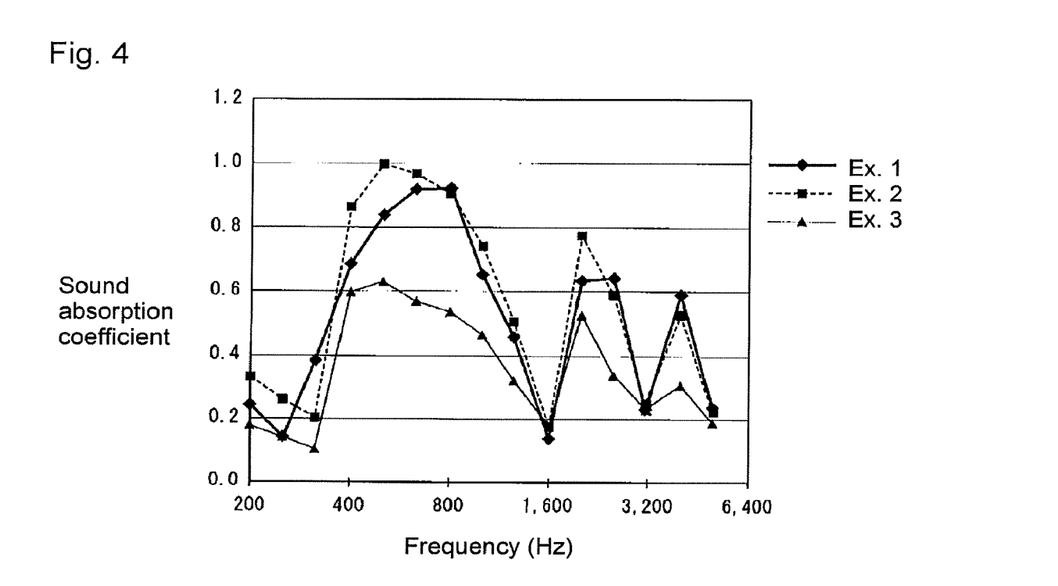
FIG. 4 is a graph showing the sound absorbing properties of the films in Ex. 1 to 3.
Figure 5:
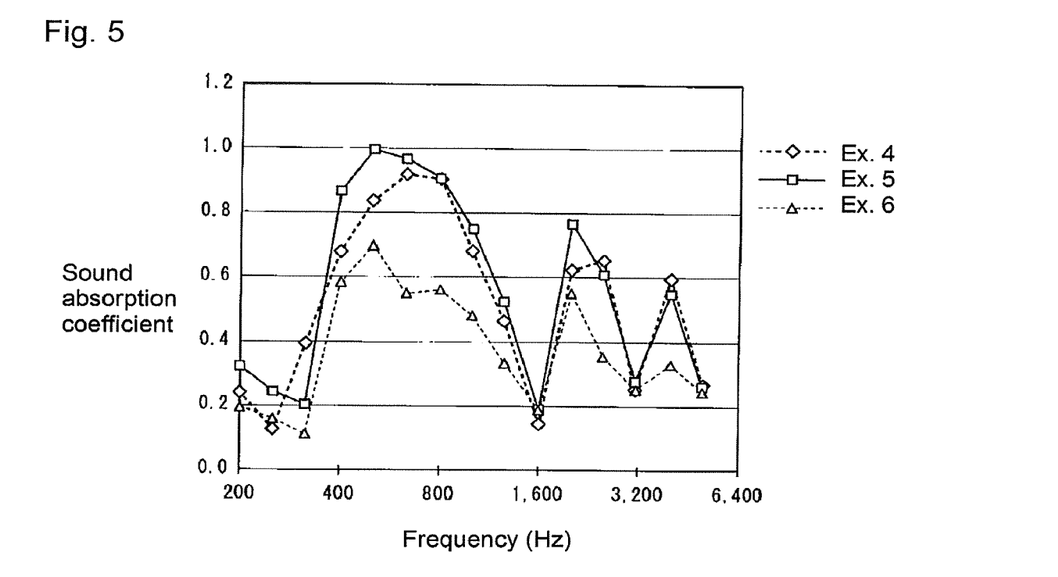
FIG. 5 is a graph showing the sound absorbing properties of the films in Ex. 4 to 6.

The evaluation results of Ex. 1 to 6 are shown in Table 1 and FIGS. 4 to 5.

TABLE 1

|   |   | Ex. 1 | Ex. 2 | Ex. 3 | Ex. 4 | Ex. 5 | Ex. 6 |
|---|---|---|---|---|---|---|---|
| Film | Average thickness t (μm) | 200 | 200 | 200 | 200 | 200 | 200 |
|  | Average hole diameter d (μm) of through hole | 245 | 206 | 103 | 245 | 206 | 103 |
|  | d/t | 1.23 | 1.03 | 0.52 | 1.23 | 1.03 | 0.52 |
|  | Open area rate y (%) | 1.18 | 0.83 | 0.21 | 1.18 | 0.83 | 0.21 |
|  | Average hole depth T (μm) of through hole | 260 | 220 | 205 | 260 | 220 | 205 |
|  | T/t | 1.30 | 1.10 | 1.03 | 1.30 | 1.10 | 1.03 |
|  | Area layer (mm) | 100 | 100 | 100 | 100 | 100 | 100 |
| Evaluation | Average sound absorption coefficient for from 200 to 4,000 Hz | 0.534 | 0.578 | 0.366 | 0.536 | 0.584 | 0.381 |
|  | Visible light transmittance (%) | 88.7 | 89.5 | 90.5 | 88.7 | 89.5 | 90.5 |
|  | Haze (%) | 22.2 | 21.5 | 20.5 | 22.2 | 21.5 | 20.5 |

As shown in Table 1, the films of Ex. 1, 2, 4 and 5 had an average sound absorption coefficient of at least 0.5, which means that these films had an excellent sound absorbing property.

In contrast, the films of Ex. 3 and 6, which failed to satisfy the relationships of "0.7<d/t<1.4" and "0.5<y<1.7", had an average sound absorption coefficient of less than 0.5, which means that these films had an insufficient sound absorbing property.

It should be noted that there is no significant difference in sound absorbing property between a case where a side of a film with the burrs faced toward the sound source (Ex. 1 and 2) and a case where such a side faced toward the reflecting member (Ex. 4 and 5).

Ex. 7

A film was produced in the same way as in Ex. 2 except that heat treatment was performed by use of heat rolls having 120° C.

Ex. 8

A film was produced in the same way as in Ex. 1 except that the silk needles were stuck in a depth of 3 mm to form through holes.

Ex. 9

A film was produced in the same way as in Ex. 1 except that the silk needles were stuck in a depth of 4 mm to form through holes.

Ex. 10

A film was produced in the same way as in Ex. 1 except that the film-like base material was stuck with the silk needles in a depth of 1 mm to form through holes, being supplied at a speed of 15 m/min.

Ex. 11

A film was produced in the same way as in Ex. 1 except that silk needles having a diameter of 0.45 mm for ultra-thin fabrics were used to stick the sheet with the silk needles at pitches of 1.4 mm in longitudinal and lateral directions and in a depth of 1 mm so as to form through holes.

Ex. 12

A pressing method was used to form through holes in a film-like base material of ETFE 150 such that the through holes were provided with burrs only on one side of the base material. Specifically, the pressing method used a device for press-punching holes in pitches of 2 mm in longitudinal and lateral directions and in a diameter of about 0.200 mm with the clearance between the top mold and the bottom mold being set at 0.040 mm.

Figure 6:
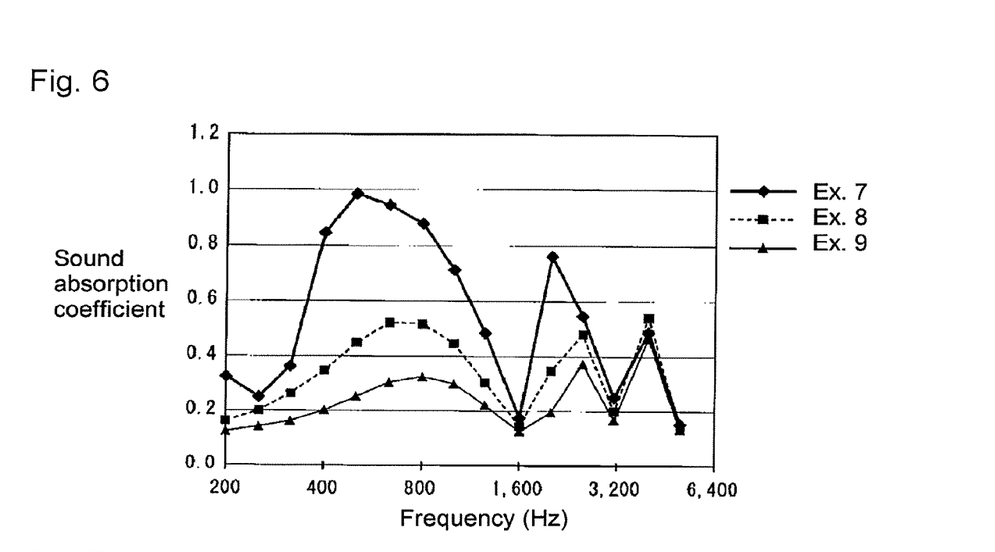
FIG. 6 is a graph showing the sound absorbing properties of the films in Ex. 7 to 9.
Figure 7:
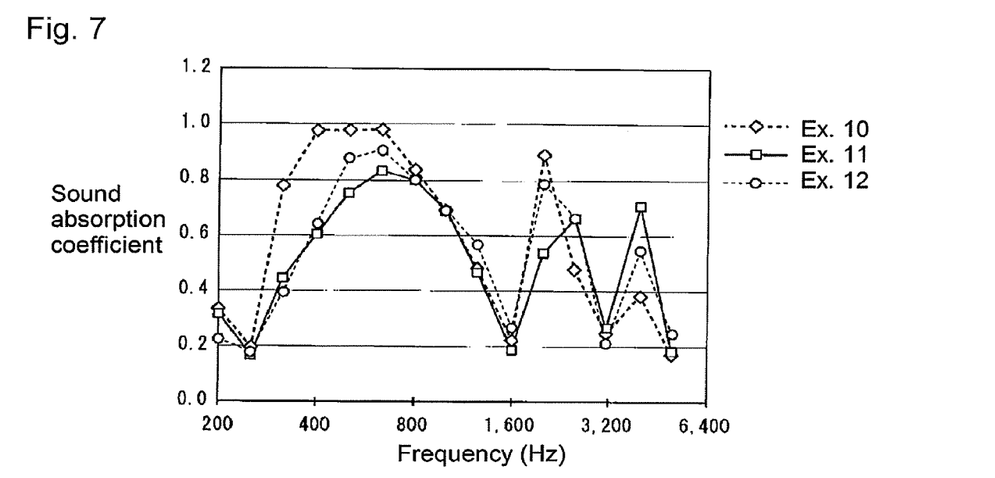
FIG. 7 is a graph showing the sound absorbing properties of the films in Ex. 10 to 12.

The evaluation results of Ex. 7 to 12 are shown in Table 2 and FIGS. 6 to 7.

TABLE 2

|  |  | Ex. 7 | Ex. 8 | Ex. 9 | Ex. 10 | Ex. 11 | Ex. 12 |
| --- | --- | --- | --- | --- | --- | --- | --- |
| Film | Average thickness t (μm) | 200 | 200 | 200 | 200 | 200 | 150 |
|  | Average hole diameter d (μm) of through hole | 162 | 295 | 399 | 201 | 201 | 190 |
|  | d/t | 0.81 | 1.48 | 2.00 | 1.01 | 1.01 | 1.27 |
|  | Open area rate y (%) | 0.52 | 0.71 | 3.12 | 0.79 | 1.61 | 0.72 |
|  | Average hole depth T (μm) of through hole | 218 | 260 | 280 | 300 | 220 | 155 |
|  | T/t | 1.09 | 1.30 | 1.40 | 1.50 | 1.10 | 1.03 |
| Area layer (mm) |  | 100 | 100 | 100 | 100 | 100 | 100 |
| Evaluation | Average sound absorption coefficient for from 200 to 4,000 Hz | 0.571 | 0.350 | 0.239 | 0.625 | 0.546 | 0.578 |
|  | Visible light transmittance (%) | 89.2 | 89.0 | 89.9 | 88.5 | 87.9 | 91.9 |
|  | Haze (%) | 21.0 | 21.0 | 19.0 | 22.5 | 25.2 | 17.9 |

As shown in Table 2, the films of Ex. 7 and 10 to 12 had an average sound absorption coefficient of at least 0.5, which means that these films had an excellent a sound absorbing property.

In contrast, the films of Ex. 8 and 9, which failed to satisfy the relationships of "0.7<d/t<1.4" and "0.5<y<1.7", had an average sound absorption coefficient of less than 0.5, which means that these films had an insufficient sound absorbing property.

Ex. 13

Two sheets of the film produced in Ex. 1 were used. When the sound absorbing coefficient was measured, both sheets of the film were set in the acoustic tube so as to have a side with the burrs facing the sound source.

Ex. 14

Two sheets of the film produced in Ex. 2 were used. When the sound absorbing coefficient was measured, both sheets of the film were set in the acoustic tube so as to have a side with the burrs facing the sound source.

Ex. 15

Two sheets of the film produced in Ex. 3 were used. When the sound absorbing coefficient was measured, both sheets of the film were set in the acoustic tube so as to have a side with the burrs facing the sound source.

Figure 8:
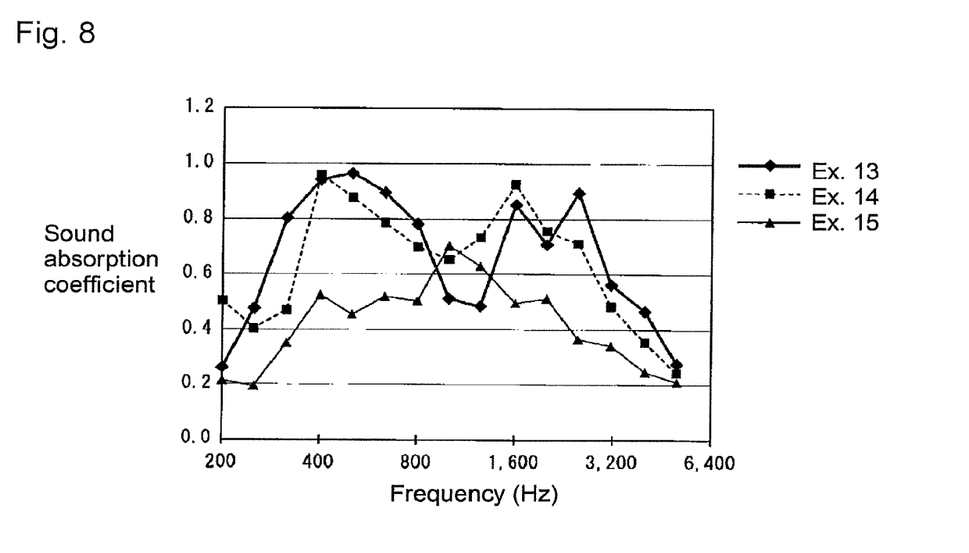
FIG. 8 is a graph showing cases where two films are disposed in Ex. 13 to 15.

The evaluation results of Ex. 13 to 15 are shown in Table 3 and FIG. 8.

TABLE 3

|  |  |  | Ex. 13 | Ex. 14 | Ex. 15 |
| --- | --- | --- | --- | --- | --- |
| First sheet (close to sound source) | Film | Average thickness t (μm) | 200 | 200 | 200 |
|  |  | Average hole diameter d (μm) of through hole | 245 | 206 | 103 |
|  |  | d/t | 1.23 | 1.03 | 0.52 |
|  |  | Open area rate y (%) | 1.2 | 0.83 | 0.21 |
|  |  | Average hole depth T (μm) of through hole | 260 | 220 | 205 |
|  |  | T/t | 1.30 | 1.10 | 1.03 |
| Area layer (mm) |  |  | 30 | 30 | 30 |
| Second sheet (close to reflecting member) | Film | Average thickness t (μm) | 200 | 200 | 200 |
|  |  | Average hole diameter d (μm) of through hole | 245 | 206 | 103 |
|  |  | d/t | 1.23 | 1.03 | 0.52 |
|  |  | Open area rate y (%) | 1.2 | 0.83 | 0.21 |

TABLE 3-continued

|  |  | Ex. 13 | Ex. 14 | Ex. 15 |
| --- | --- | --- | --- | --- |
|  | Average hole depth T (μm) of through hole | 260 | 220 | 205 |
|  | T/t | 1.30 | 1.10 | 1.03 |
| Rear air layer (mm) |  | 100 | 100 | 100 |
| Evaluation | Average sound absorption coefficient for from 200 to 4,000 Hz | 0.687 | 0.666 | 0.433 |

As shown in Table 3, the provision of two films in Ex. 13 and 14 achieved a further improved sound absorption coefficient than the cases where a single film was set, and reduced a decrease in the sound absorption coefficient for 1,600 Hz and 3,200 Hz in comparison with Ex. 1 to 12.

Although even Ex. 15 reduced a decrease in the sound absorption coefficient for the above-mentioned two frequencies and had an improved average sound absorption coefficient in comparison with cases where a single film was set, this example had an insufficient average sound absorption coefficient of less than 0.5.

INDUSTRIAL APPLICABILITY

The film according to the present invention is usable as a sound absorbing film and may be disposed on a sound source facing side of e.g. a roofing material, a ceiling material, an outer wall material or an inner wall material such that a rear air layer is sandwiched between the film and the sound source facing side.

This application is a continuation of PCT Application No. PCT/JP2016/066482, filed on Month Day, 2016, which is based upon and claims the benefit of priority from Japanese Patent Application No. 2015-116702 filed on Jun. 9, 2015. The contents of those applications are incorporated herein by reference in their entireties.

REFERENCE SYMBOLS

1: film, 1a: first side, 1b: second side, 2: through hole, 2a: burr, 2b: burr, di: hole diameter, Ti: depth of through hole, ti: thickness of portion of film with no through holes being formed therein, h: distance between adjacent films, H: distance between film and sound wave reflecting member, 3: sound wave reflecting member, 3a: sound wave reflecting surface, 10: sound absorbing structure

What is claimed is:

1. A film comprising a plurality of through holes formed therein,
    the film having an average thickness t (μm) in portions of the film having no through holes formed therein, and having an open area rate y (%) per unit area,
    the through holes having an average depth T (μm) including a burr on a circumferential edge thereof, an average hole diameter d (μm), and
    the film satisfying the following:
    90≤t≤300,
    1.02<T/t≤1.5,
    0.7<d/t<1.4, and
    0.5<y<1.7.

2. The film according to claim 1, wherein the film comprises a fluororesin.

3. The film according to claim 1, wherein the film comprises an ethylene-tetrafluoroethylene copolymer.

4. The film according to claim 1, wherein the film has an average sound absorption coefficient of at least 0.5 for sounds having a frequency of from 200 Hz to 4,000 Hz as measured based on JIS A1405-2:2007.

5. The film according to claim 1, wherein the film has a visible light transmittance of at least 60% by measurement of visible light transmittance based on JIS R-3106:1998.

6. A sound absorbing structure comprising:
    the film of claim 1, and
    a sound wave reflector disposed to face the film via an air layer.

7. The sound absorbing structure according to claim 6, wherein the air layer has a thickness of from 10 mm to 1,000 mm.

8. The sound absorbing structure according to claim 6, wherein the sound absorbing structure is placed such that the film faces a sound source.

9. The film according to claim 1, wherein the film satisfies formula: 1≤T/t≤1.4.

10. The film according to claim 1, wherein the film satisfies formula: 0.8≤d/t≤1.3.

11. The film according to claim 1, wherein the film satisfies formula: 0.7≤y≤1.5.

12. The sound absorbing structure according to claim 6, wherein the air layer has a thickness of from 50 mm to 600 mm.

13. The sound absorbing structure according to claim 6, wherein the air layer has a thickness of from 100 mm to 300 mm.

14. A sound absorbing structure comprising:
    at least two films, each of which is the film of claim 1 and disposed to overlap with each other, and
    a sound wave reflector disposed to face the at least two films via an air layer.

15. The sound absorbing structure according to claim 14, wherein adjacent films among the at least two films are apart from each other by a distance of from 20 mm to 50 mm.

16. The sound absorbing structure according to claim 14, wherein the air layer has a thickness of from 10 mm to 1,000 mm.

17. The sound absorbing structure according to claim 14, wherein adjacent films among the at least two films are apart from each other by a distance of from 5 mm to 500 mm.

18. The sound absorbing structure according to claim 14, wherein the sound absorbing structure is placed such that the at least two films face a sound source.

19. The sound absorbing structure according to claim 14, wherein the air layer has a thickness of from 50 mm to 600 mm.

20. The sound absorbing structure according to claim 14, wherein the air layer has a thickness of from 100 mm to 300 mm.

* * * * *